Figure 1:
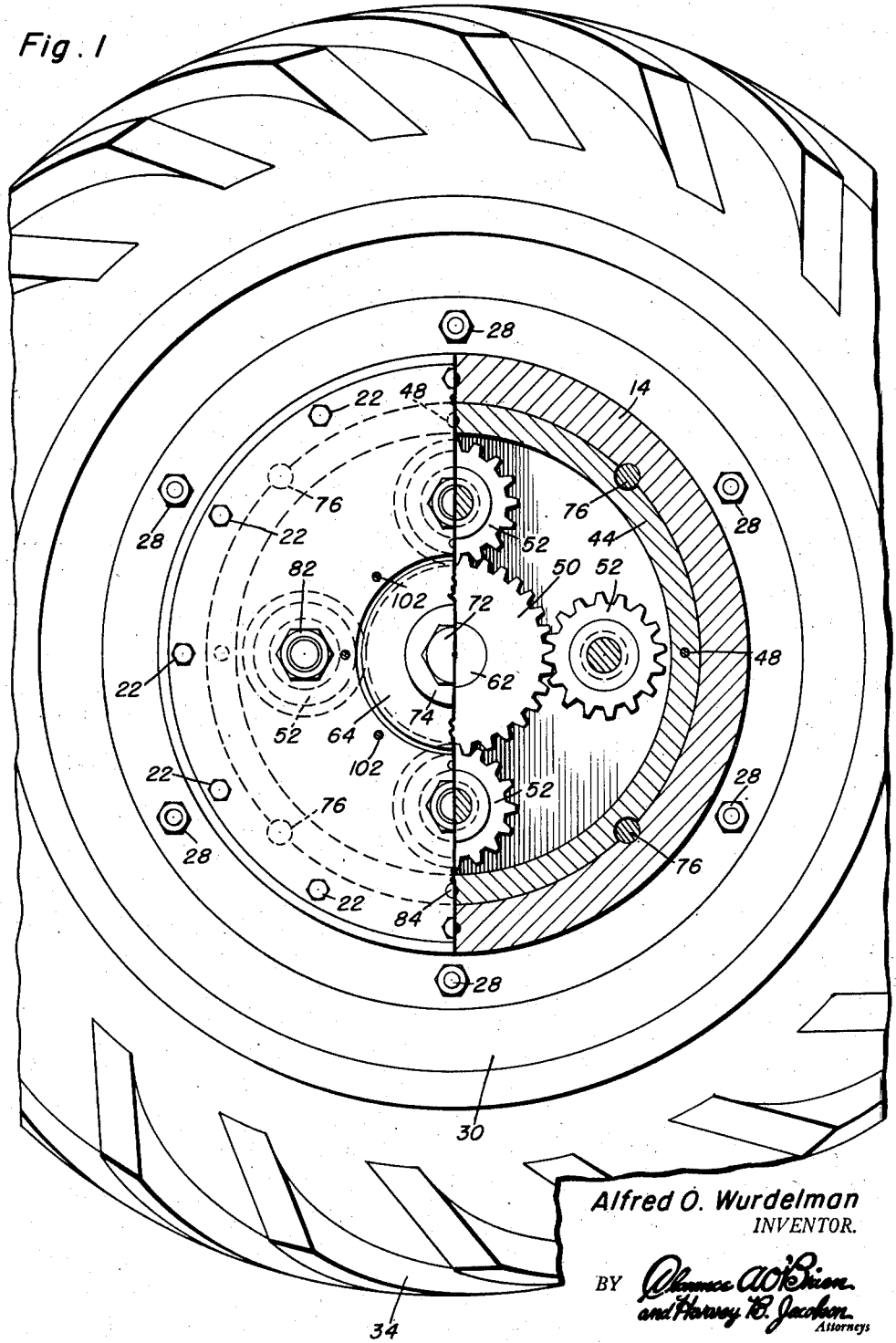

April 8, 1958     A. O. WURDELMAN     2,829,725
TRACTOR WHEEL HUB SHIFTING DEVICE
Filed Feb. 13, 1956     2 Sheets-Sheet 1

Alfred O. Wurdelman
INVENTOR.

April 8, 1958

A. O. WURDELMAN 2,829,725

TRACTOR WHEEL HUB SHIFTING DEVICE

Filed Feb. 13, 1956

2 Sheets-Sheet 2

Alfred O. Wurdelman
INVENTOR.

United States Patent Office 2,829,725
Patented Apr. 8, 1958

2,829,725

TRACTOR WHEEL HUB SHIFTING DEVICE

Alfred O. Wurdelman, Port Hope, Mich.

Application February 13, 1956, Serial No. 564,992

8 Claims. (Cl. 180—75)

This invention relates in general to new and useful improvements in tractors, and more specifically to improvements in tractors of the type having wheel spacing means.

In order to conform with the different crop row widths or to correct the line of draft for a given implement in order to make the tractor more stable and efficient, it is frequently desirable to change the lateral spacing of the rear wheels, in particular, of a tractor. In order to accomplish this, it is necessary to shift the wheels and their mounting means along the rear axles. Heretobefore all practical means for shifting the wheels has required that the individual wheels of the tractor be jacked up and then the wheels and their mounting means be shifted along the axles primarily utilizing manual power. This procedure is not only time consuming, but dangerous inasmuch as it requires the jacking of at least one wheel of the axle off the ground.

It is therefore the primary object of this invention to provide wheel shifting means which utilizes the power of the tractor applied through the rear axles thereof whereby the shifting means are driven by the rear axles to shift the wheels longitudinally along the rear axles in the desired direction whereby jacking of the wheels off the ground is completely eliminated.

Another object of this invention is to provide an improved shifting device for wheels of a tractor, the shifting device forming both the means for connecting the tractor wheel hub to the axle in driving relation and the means for effecting the longitudinal shifting of the hub with respect to the axle.

Still another object of this invention is to provide an improved tractor wheel hub shifting device which is so constructed whereby it is mounted completely within the hub and is sealed against foreign elements including dust whereby the mechanism of the shifting device is clearly protected at all times.

A further object of this invention is to provide an improved wheel hub shifting device for tractors, the wheel hub shifting device including a gear assembly which is normally locked against rotation and which drivingly connects the wheel hub to a rear axle and which when released operates shift means for moving the wheel hub longitudinally of the rear axle.

A still further object of this invention is to provide an improved shifting device for tractor wheel hubs, the shifting device employing a gear assembly driven by the axle and connected to shift elements carried by the hub, the gear assembly being controlled in operation by a clutch which may be easily manually operated and which is positive in action.

Figure 2:
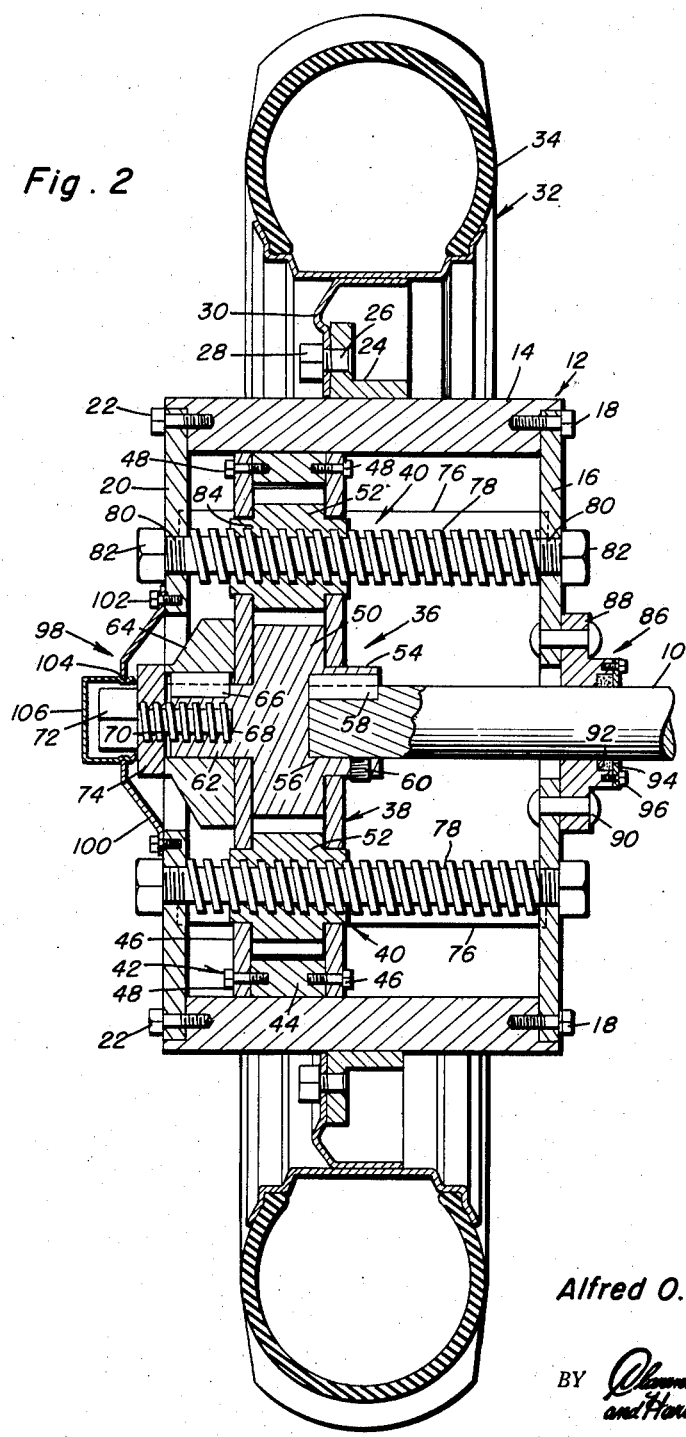

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary side elevational view of a rear tractor wheel employing the hub shifting device which is the subject of this invention, a portion of the hub and a gear housing being broken away and shown in section in order to illustrate certain of the details of the shifting device; and Figure 2 is a vertical sectional view taken through the center of the tractor wheel of Figure 1 and shows the specific details of the shifting device and the manner in which the wheel hub is mounted on a rear axle of the tractor.

Referring now to the drawings in detail, it will be seen that there is illustrated a tractor rear axle 10 on which there is mounted a wheel hub assembly, which is referred to in general by the reference numeral 12. The wheel hub assembly 12 includes a cylindrical hub 14 which has secured to the inner end thereof an inner hub plate 16 by means of suitable fasteners 18. Secured to the outer end of the hub 14 is an outer hub plate 20, the hub plate 20 being secured in place by a plurality of fasteners 22.

The hub 14 has secured to the outer periphery thereof along the center a plurality of circumferentially spaced wheel mounting lugs 24. Carried by each of the wheel mounting lugs 24 is a wheel mounting lug bolt 26 having a nut 28. Secured to the wheel mounting lugs 24 by the wheel mounting lug bolts 26 is a rim 30 of a wheel which is referred to in general by the reference numeral 32. The wheel 32 also includes a suitable tire 34.

In the use of the tractor of which the rear axle 10 and the wheel 32 form parts, it is desirable to shift the wheel 32 longitudinally along the axle 10 so as to compensate for various row spacing and for proper alignment of the tractor wheel with a draft implement for maximum efficiency. In order to accomplish this, there is incorporated in the hub assembly 12 a hub shifting device which is referred to in general by the reference numeral 36. The hub shifting device 36 includes a gear assembly, which is referred to in general by the reference numeral 38 and shifting means which are referred to in general by the reference numeral 40.

The gear assembly 38 includes a housing which is referred to in general by the reference numeral 42. The gear housing 42 includes a cylindrical body member 44 having secured to opposite ends thereof side plates 46. The side plates 46 are secured to the body member 44 by means of a plurality of circumferentially spaced fasteners 48.

Disposed centrally of the housing 42 and journaled in the side plates 46 is a drive gear 50. The drive gear 50 because of its central location may be considered a sun gear and is meshed with a plurality of outer or planetary gears 52. The planetary gears 52 are driven gears and are also suitable journaled in the side plates 46, as is best illustrated in Figure 2.

The drive gear 50 has an inner hub portion 54 with a bore 56 therein. The bore 56 is coaxial with the center of the drive gear 50 and has received therein an outer end of the axle 10. The axle 10 is connected to the gear 50 in driving relation by means of a key 58. The gear 50 is locked on the axle 10 against longitudinal movement by means of a suitable set screw 60.

The gear 50 also includes an outer hub portion 62 which is of a reduced cross section as compared to the inner hub portion 54. Slidably positioned on the outer hub portion 62 is a clutch member 64 which is keyed to the hub portion 62 for rotation with the gear 50 by means of a key 66. The hub portion 62 includes an internally threaded bore 68 in which there is disposed a threaded shank 70 of a clutch actuating member 72. Disposed between a head portion of the clutch actuating member 72 and the outer end of the clutch member 64 is a suitable bushing 74. By tightening down on the clutch operating member 72, the clutch member 64 is clamped against the outermost one of the side plates 46 of the gear housing 42. This locks the gear housing 42 to the drive gear 50 and prevents relative rotation of any part of the gear assembly 38.

In order that the gear assembly 38 may be used to drive the wheel 32 through the hub assembly 12, the gear housing 42 is locked to the hub 14 by means of a plurality of longitudinally extending, circumferentially spaced pins 76. The pins 76 are partially disposed in the hub 14 and partially in the body portion 44. It is to be understood that the pins 76 extend the full length of the hub 14 and permit sliding movement of the hub 14 with respect to the gear housing 42. The plates 16 and 20 overlie the ends of the pins 76 and prevent the removal thereof.

The shifting means 40 includes a plurality of circumferentially spaced threaded members 78. Each threaded member 78 has an axis aligned with the axis of one of the gears 52, there being an equal number of threaded members 78 and gears 52. Each threaded member 78 includes a reduced threaded end portion 80 which is received in one of the plates 16 and 20. Engaged on threaded end portion 80 is a nut 82 which retains the threaded member 78 in place and prevents rotation thereof.

The shift means 40 also includes an integral nut portion 84 formed in each of the gears 52. The nut portion 84 of each gear 52 has threadedly engaged therein an intermediate portion of the threaded member 78. Thus when the gears 52 are driven, there is a relative movement between the gears 52 and the threaded members 78.

In order that the interior of the hub assembly 12 may be sealed against the entrance of dust and other foreign matter, there is secured to the inner plate 16 a dust seal assembly which is referred to in general by the reference numeral 86. The dust seal assembly 86 includes a plate 88 which is secured to the plate 16 by means of suitable fasteners 90. Carried by the plate 88 is a dust seal 92 which engages the periphery of the axle 10. The dust seal 92 is held in place by a retaining ring 94 which is removably secured to the plate 88 by means of suitable fasteners 96.

A second dust seal assembly, which is referred to in general by the reference numeral 98, is carried by the outer plate 20. The dust seal assembly 98 includes a plate 100 which is secured to the plate 20 by means of suitable fasteners 102. The plate 20 is outwardly bowed and has a central opening 104 through which access to the clutch operator 72 is obtained. Normally closing the opening 104 is a dust cap 106 which may be snapped in place.

It is to be understood that inasmuch as the hub assembly 12 contains the gear assembly 38, in order that lubrication may be provided for the gear assembly 38, the hub assembly 12 is packed wtih grease. Because of the dust seals carried by the hub assembly 12, entrance of dust and other foreign matter into the interior of the hub assembly 12 is prevented. Thus the grease or other lubricant which may be desired, is retained in a relatively clean state at all times and no inspection of the shifting device 36 is required.

When it is desired to change the spacing of wheels 34, it is merely necessary for the operator of the tractor of which the wheels 32 are parts to remove the dust cap 106 of each hub assembly 12 and to release the clutch operator 72 using a suitable wrench. By releasing the clutch operator 72, the clutch member 64 is released thus permitting rotation of the gear housing 42. Then by driving the tractor in a desired direction, the axle 10 and the drive gear 50 will rotate. The gear housing 42 and the gears 52 together with the hub assembly 12 will remain stationary with respect to the axle 10 although the gears 52 will rotate. As the gears 52 rotate, they will feed the threaded members 78 therethrough, the gear housing 42 being fixed against shifting longitudinally of the axle 10, thus causing the hub assembly 12 to shift longitudinally of the axle 10 in the desired direction. After the desired wheel of spacing has been obtained, the clutch operator 72 is again tightened down to move the clutch member 64 to its operative position. The hub assembly 12 is once again locked to the axle 10 for rotation therewith and the dust cap 106 and then replaced.

From the foregoing description of the operation of the shifting device 36, it will be readily apparent that the power of the tractor is utilized in the shifting of the wheels thereof and that therefore the wheels 32 will slide with respect to the ground even though the ground may be plowed or otherwise rough. Thus the necessity of jacking the wheels up out of engagement with the ground is eliminated and accordingly both the time and labor consuming undesirable feature of present types of shift mechanism and the dangerous element of jacking the wheels off the ground are eliminated.

It is to be understood that the present invention may be adapted to all types of present tractors and may be incorporated both on newly designed tractors and those tractors which are already in existence with a minimum of revision.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a tractor wheel shifting device comprising an axle, a hub having wheel mounting means, means rotatably journaling said hub on said axle, shift means mounted within said hub for shifting said hub on said axle, a gear assembly mounted within said hub and connecting said axle to said shift means for operating said shift means, and means for releasably locking said gear assembly to said hub whereby said axle, said gear assembly, said shift means and said hub rotate as a unit.

2. In a tractor wheel shifting device comprising an axle, a hub having wheel mounting means, means rotatably journaling said hub on said axle, shift means mounted within said hub for shifting said hub on said axle, a gear assembly mounted within said hub and connecting said axle to said shift means for operating said shift means, and a releasable clutch carried by said gear assembly for locking said gear assembly to said hub whereby said axle, said gear assembly, said shift means and said hub rotate as a unit.

3. In a tractor wheel shifting device comprising an axle, a hub having wheel mounting means, means rotatably journaling said hub on said axle, shift means mounted within said hub for shifting said hub on said axle, a gear assembly mounted within said hub and connecting said axle to said shift means for operating said shift means, said gear assembly including a housing, and means for releasably locking said gear housing to said axle whereby said axle, said gear assembly, said shift means and said hub rotate as a unit.

4. In a tractor wheel shifting device comprising an axle, a hub having wheel mounting means, means rotatably journaling said hub on said axle, shift means mounted within said hub for shifting said hub on said axle, a gear assembly mounted within said hub and connecting said axle to said shift means for operating said shift means, said gear assembly including a housing, means interlockingly connecting said hub to said gear housing for relative longitudinal sliding movement only, and a clutch carried by said axle for locking said gear housing to said axle whereby said axle, said gear assembly, said shift means and said hub rotate as a unit.

5. In a tractor wheel shitfing device comprising an axle, a hub having wheel mounting means, means rotatably journaling said hub on said axle, shift means mounted within said hub for shifting said hub on said axle, a gear assembly mounted within said hub and connecting said axle to said shift means for operating said shift means, said gear assembly including a drive gear mounted on said axle for rotation with said axle, at least one driven gear meshed with said drive gear, said shift means including a threaded feed member fixedly carried by said hub, said driven gear having a central nut portion threadedly receiving said feed member whereby when said driven gear is rotated said hub is shifted along said axle, and means for releasably locking said gear assembly whereby said axle, said gear assembly, said shift means and said hub rotate as a unit.

6. In a tractor wheel shifting device comprising an axle, a hub having wheel mounting means, means rotatably journaling said hub on said axle, shift means mounted within said hub for shifting said hub on said axle, a gear assembly mounted within said hub and connecting said axle to said shift means for operating said shift means, said gear assembly including a drive gear mounted on said axle for rotation with said axle, at least one driven gear meshed with said drive gear, said shift means including a threaded feed member fixedly carried by said hub, said driven gear having a central nut portion threadedly receiving said feed member whereby when said driven gear is rotated said hub is shifted along said axle, said gear assembly including a releasable clutch normally rendering said gear assembly inoperative, said clutch being releasable to permit said gear assembly to drive said shift means.

7. In a tractor wheel shifting device comprising an axle, a hub having wheel mounting means, means rotatably journaling said hub on said axle, shift means mounted within said hub for shifting said hub on said axle, a gear assembly mounted within said hub and connecting said axle to said shift means for operating said shift means, said gear assembly including a drive gear mounted on said axle for rotation with said axle, at least one driven gear meshed with said drive gear, said shift means including a threaded feed member fixedly carried by said hub, said driven gear having a central nut portion threadedly receiving said feed member whereby when said driven gear is rotated said hub is shifted along said axle, said gear assembly including a gear housing, means interlockingly connecting said hub to said gear housing for sliding movement only of said hub longitudinally of said axle.

8. In a tractor wheel shifting device comprising an axle, a hub having wheel mounting means, means rotatably journaling said hub on said axle, shift means mounted within said hub for shifting said hub on said axle, a gear assembly mounted within said hub and connecting said axle to said shift means for operating said shift means, said gear assembly including a drive gear mounted on said axle for rotation with said axle, at least one driven gear meshed with said drive gear, said shift means including a threaded feed member fixedly carried by said hub, said driven gear having a central nut portion threadedly receiving said feed member whereby when said driven gear is rotated said hub is shifted along said axle, said gear assembly including a gear housing, means interlockingly connecting said hub to said gear housing for sliding movement only of said hub longitudinally of said axle, and a clutch carried by said axle releasably locking said gear housing to said axle whereby said axle, said gear assembly, said shift means and said hub rotate as a unit.

References Cited in the file of this patent
UNITED STATES PATENTS

| | | |
|---|---|---|
| 2,099,194 | Brown | Nov. 16, 1937 |
| 2,454,130 | Braun | Nov. 16, 1948 |